US012599234B2

(12) United States Patent
Tsay

(10) Patent No.: US 12,599,234 B2
(45) Date of Patent: Apr. 14, 2026

(54) ELECTRIC RECLINING CHAIR WITH ANTI-PINCH PROTECTION

(71) Applicant: Yueh-Cheng Tsay, Taichung City (TW)

(72) Inventor: Yueh-Cheng Tsay, Taichung City (TW)

( * ) Notice: Subject to any disclaimer, the term of this patent is extended or adjusted under 35 U.S.C. 154(b) by 148 days.

(21) Appl. No.: 18/788,574

(22) Filed: Jul. 30, 2024

(65) Prior Publication Data

US 2025/0072611 A1 Mar. 6, 2025

(30) Foreign Application Priority Data

Aug. 29, 2023 (TW) ................................ 112209203

(51) Int. Cl.
*A47C 1/034* (2006.01)
*G08B 3/00* (2006.01)

(52) U.S. Cl.
CPC .............. *A47C 1/0345* (2013.01); *G08B 3/00* (2013.01)

(58) Field of Classification Search
CPC ......... A47C 1/00; A47C 1/0242; A47C 1/034; A47C 1/0342; A47C 1/0345; A47C 1/0347; A47C 1/035; A47C 1/0355; A47C 1/037; A47C 7/50
See application file for complete search history.

(56) References Cited

U.S. PATENT DOCUMENTS

2003/0071504 A1* 4/2003 Nivet ................. A47C 1/03211 297/330
2016/0242548 A1* 8/2016 Barnum ................. A47C 7/006
2018/0031441 A1* 2/2018 Wong ..................... H01H 13/28
2020/0139851 A1* 5/2020 Oshima .................... A47C 7/38

* cited by examiner

*Primary Examiner* — George Sun
(74) *Attorney, Agent, or Firm* — Birch, Stewart, Kolasch & Birch, LLP

(57) ABSTRACT

An electric reclining chair has a base, a linkage mechanism, a leg rest mount, and a control module. The linkage mechanism is movably mounted to the base and connected to a driver. The leg rest mount is pivotally connected to the linkage mechanism. The control module has a sensor module and a control unit. When the linkage mechanism and the leg rest mount are being folded by the driver, if an object is under the leg rest mount and abuts the leg rest mount, the leg rest mount pivots relative to the linkage mechanism, which is sensed by the sensor module. Thus, the control module controls the driver to stop folding the linkage mechanism or to unfold the linkage mechanism so as to prevent the object from being pinched.

17 Claims, 11 Drawing Sheets

ELECTRIC RECLINING CHAIR WITH ANTI-PINCH PROTECTION

BACKGROUND OF THE INVENTION

1. Field of the Invention

The present invention relates to an electric reclining chair, and particularly to an electric reclining chair with anti-pinch protection.

2. Description of Related Art

An electric reclining chair is drivable by electricity to adjust angles and positions of a seatback, a seat, a leg rest, and other components, which allows users to find the most comfortable sitting position. The leg rest is drivable by a linked mechanism via electric power to ascend for user's legs to be placed thereon or to be folded for the electric reclining chair to take up less space.

However, if an object (e.g. a basketball) moves to a space under the leg rest when the leg rest is ascended, the leg rest may abut and be stopped by the object when the leg rest is to be folded later. Thereby, the linked mechanism fails to fold the leg rest, which may lead to structural damage between the leg rest and the linked mechanism. Moreover, if a child or a pet inadvertently stretches hands or feet into the space under the leg rest, the child or the pet may be pinched by the linked mechanism or the leg rest and hurt itself.

SUMMARY OF THE INVENTION

The main objective of the present invention is to provide an electric reclining chair with anti-pinch protection which reacts when a leg rest pad abuts an object while being folded so as to prevent linked mechanisms of the leg rest from structural damage and improve safety.

The electric reclining chair with anti-pinch protection has a base, a linkage mechanism, at least one leg rest mount, and a control module. The linkage mechanism is movably mounted on the base and connected to a driver. The at least one leg rest mount is pivotally connected to the linkage mechanism. The control module has at least one sensor module and a control unit. The control unit is electrically connected to the at least one sensor module and the driver for controlling the driver to unfold or fold the linkage mechanism. If the at least one leg rest mount pivots relative to the linkage mechanism when the linkage mechanism is being folded, the at least one sensor module senses pivoting of said leg rest mount relative to the linkage mechanism to send a signal to the control unit such that the control unit controls the driver to stop folding the linkage mechanism or to unfold the linkage mechanism.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
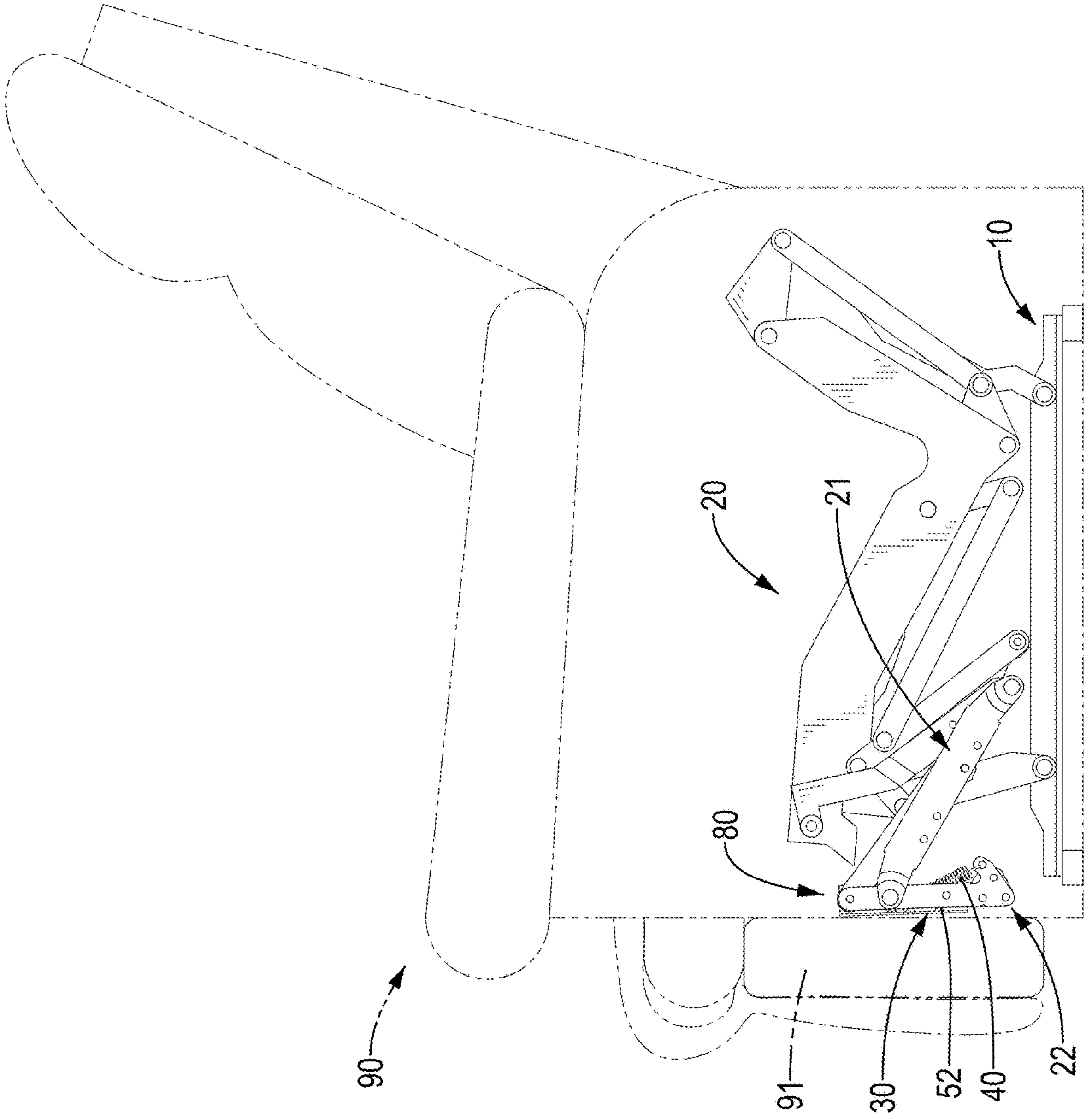
FIG. 1 is a side view of configurations in an interior of a preferred embodiment of an electric reclining chair with anti-pinch protection in accordance with the present invention.
Figure 9:
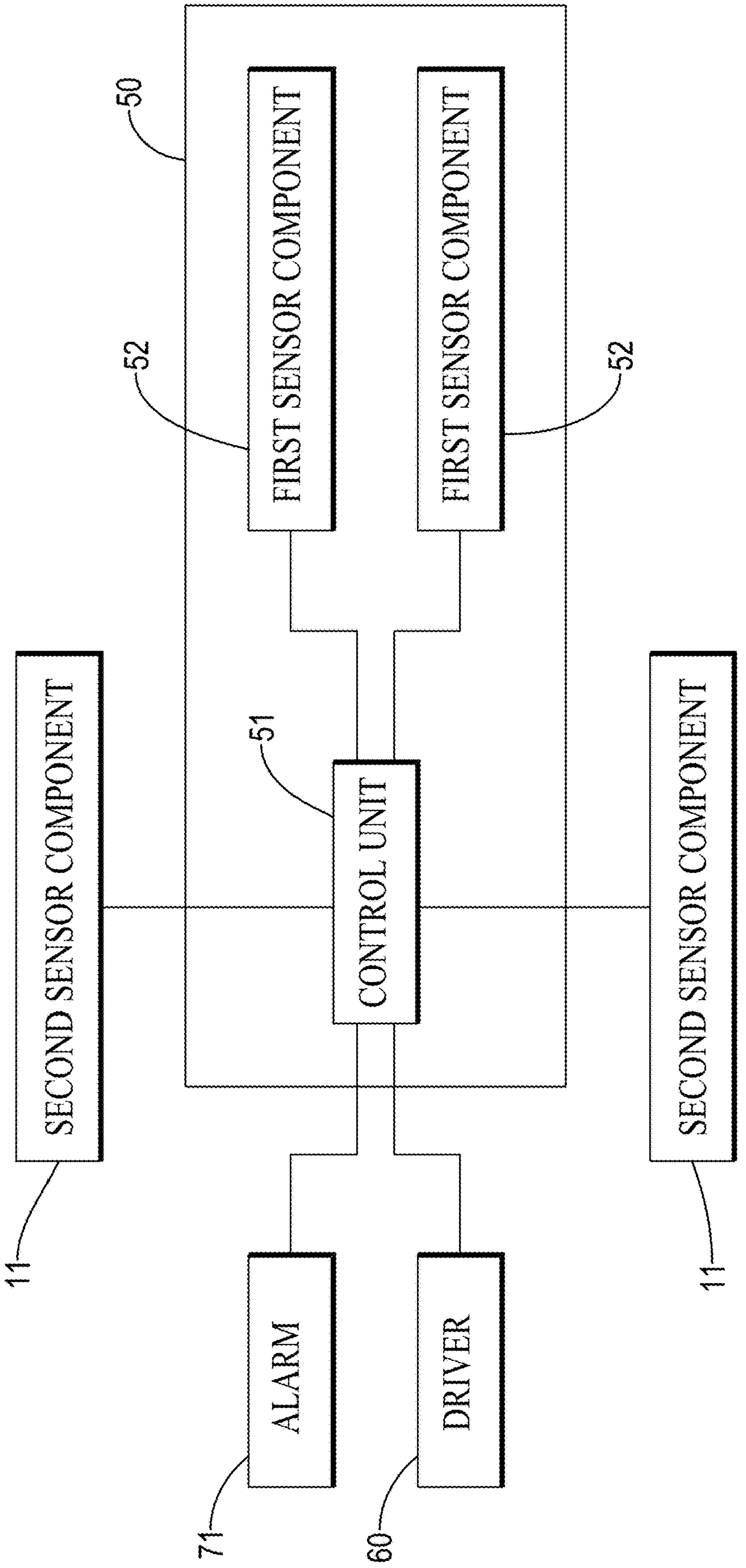
FIG. 9 is a system block diagram of the electric reclining chair in FIG. 1.

With reference to FIGS. 1 and 9, a preferred embodiment of an electric reclining chair with anti-pinch protection in accordance with the present invention has a base 10, a linkage mechanism 20, a control module 50, a driver 60, two leg rest components 80, a seat body 90, and two leg rest pads 91. The base 10 is configured for the electric reclining chair to be placed on a flat surface (e.g. on a floor), and the linkage mechanism 20 is movably disposed on the base 10. The two leg rest components 80 are disposed on the linkage mechanism 20. The seat body 90 is mounted on the base 10. The two leg rest pads 91 are connected to the seat body 90 and respectively mounted on the two leg rest components 80 for a user to place two legs respectively on the two leg rest pads 91.

With reference to FIG. 9, the control module 50 is electrically connected to the driver 60, and the driver 60 is connected to the linkage mechanism 20 and is controllable by the control module 50 to drive the linkage mechanism 20 so as to fold or unfold the linkage mechanism 20. The two leg rest components 80 are configured to be actuated by and move synchronously with the linkage mechanism 20, and thereby the two leg rest pads 91 are folded as the linkage mechanism 20 is folded and are ascended as the linkage mechanism 20 is unfolded.

Figure 2:
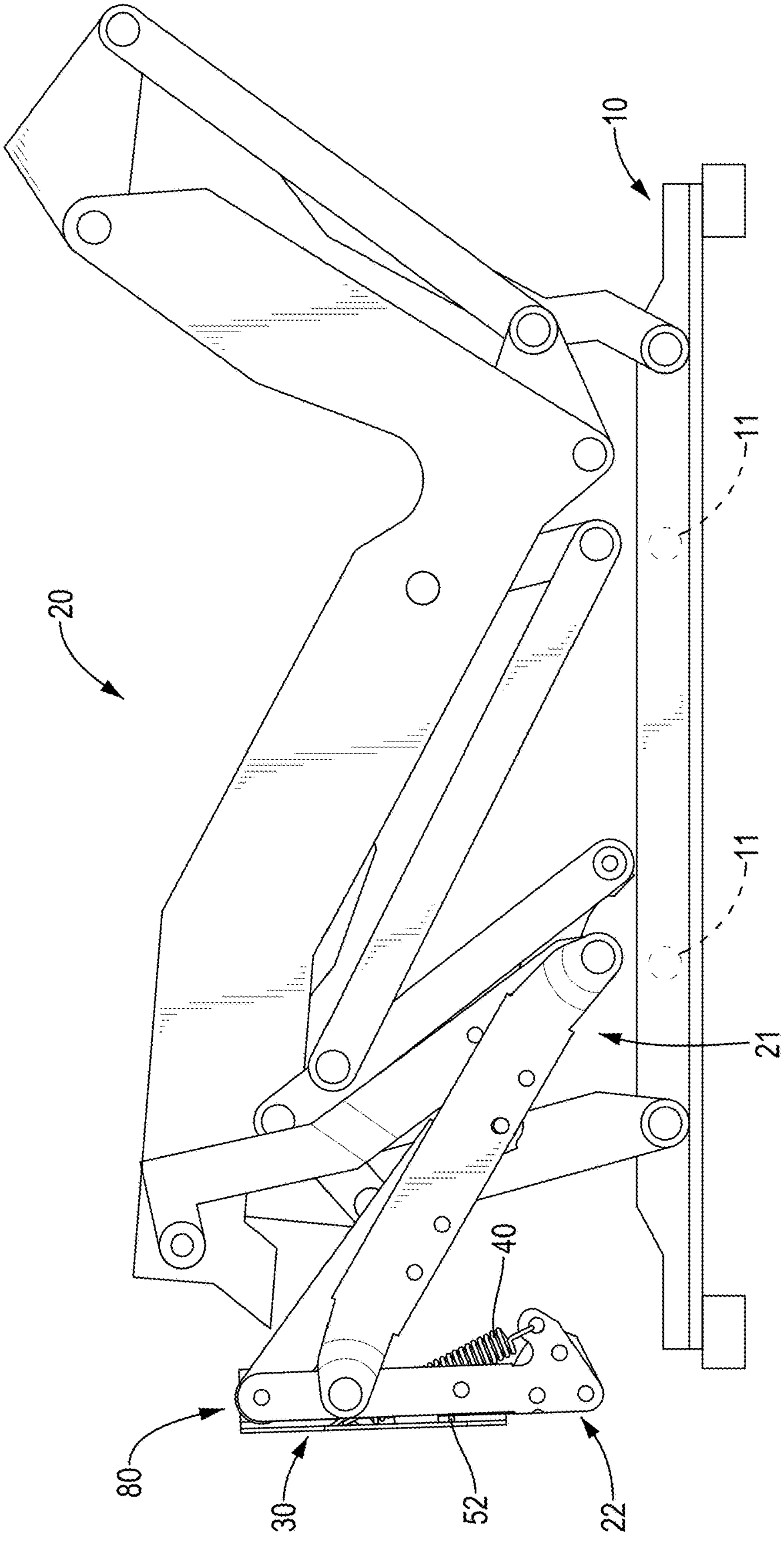
FIGS. 2 and 3 are side views of a linkage mechanism of the electric reclining chair in FIG. 1 being folded and unfolded.
Figure 3:
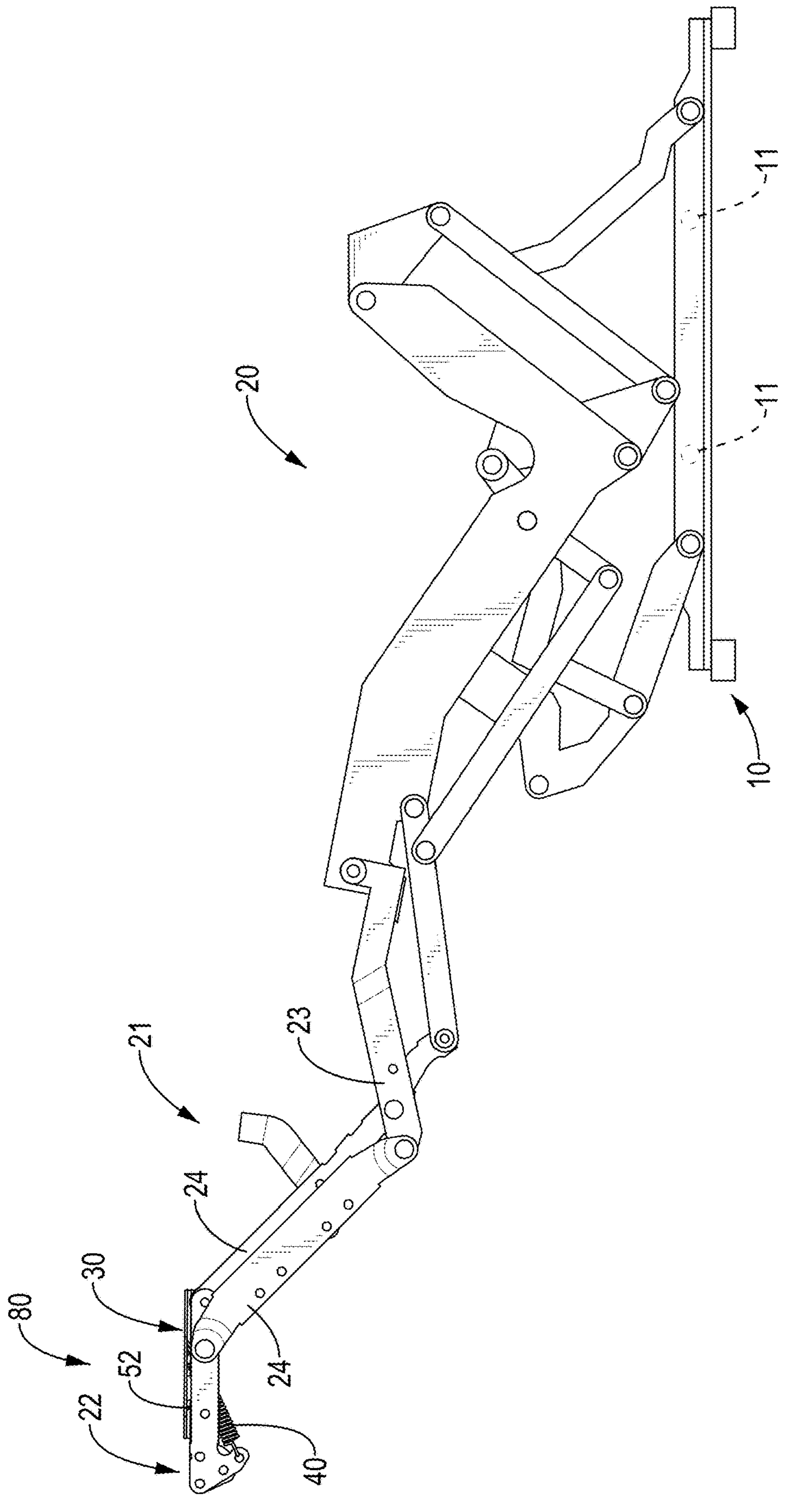

With reference to FIGS. 2 and 3, specifically, the linkage mechanism 20 has two linkage components 21 located at an end of the linkage mechanism 20 away from the base 10, and the linkage mechanism 20 is connected to the driver 60 via other links or bars at the other end of the linkage mechanism 20 such that the linkage mechanism 20 is drivable by the driver 60. In one embodiment, the driver 60 may adopt an electric linear actuator. The two leg rest components 80 are respectively mounted on the two linkage components 21. Regarding detail of the links or bars of the linkage mechanism 20 connected to the driver 60, this configuration may refer to conventional skills of the electric reclining chair. Also, for better understanding with the drawings, the following configurations are described with one of the two linkage components 21 and the corresponding leg rest component 80.

With reference to FIGS. 2 to 5, each one of the two linkage components 21 has two swing arms 22, a first link 23, and two second links 24. The two swing arms 22 are respectively a first swing arm 22A and a second swing arm 22B and are connected to each other. The two second links 24 are spaced from each other. An end of each one of the two second links 24 is pivotally connected to the first link 23, and the other end of each one of the two second links 24 is pivotally connected to the first swing arm 22A. Specifically, the first link 23, the two second links 24, and the first swing arm 22A jointly form a four-bar linkage. The four-bar linkage is connected to other components of the linkage mechanism 20 via the first link 23 and one of the two second links 24 to be drivable to be folded or unfolded.

Figure 4:
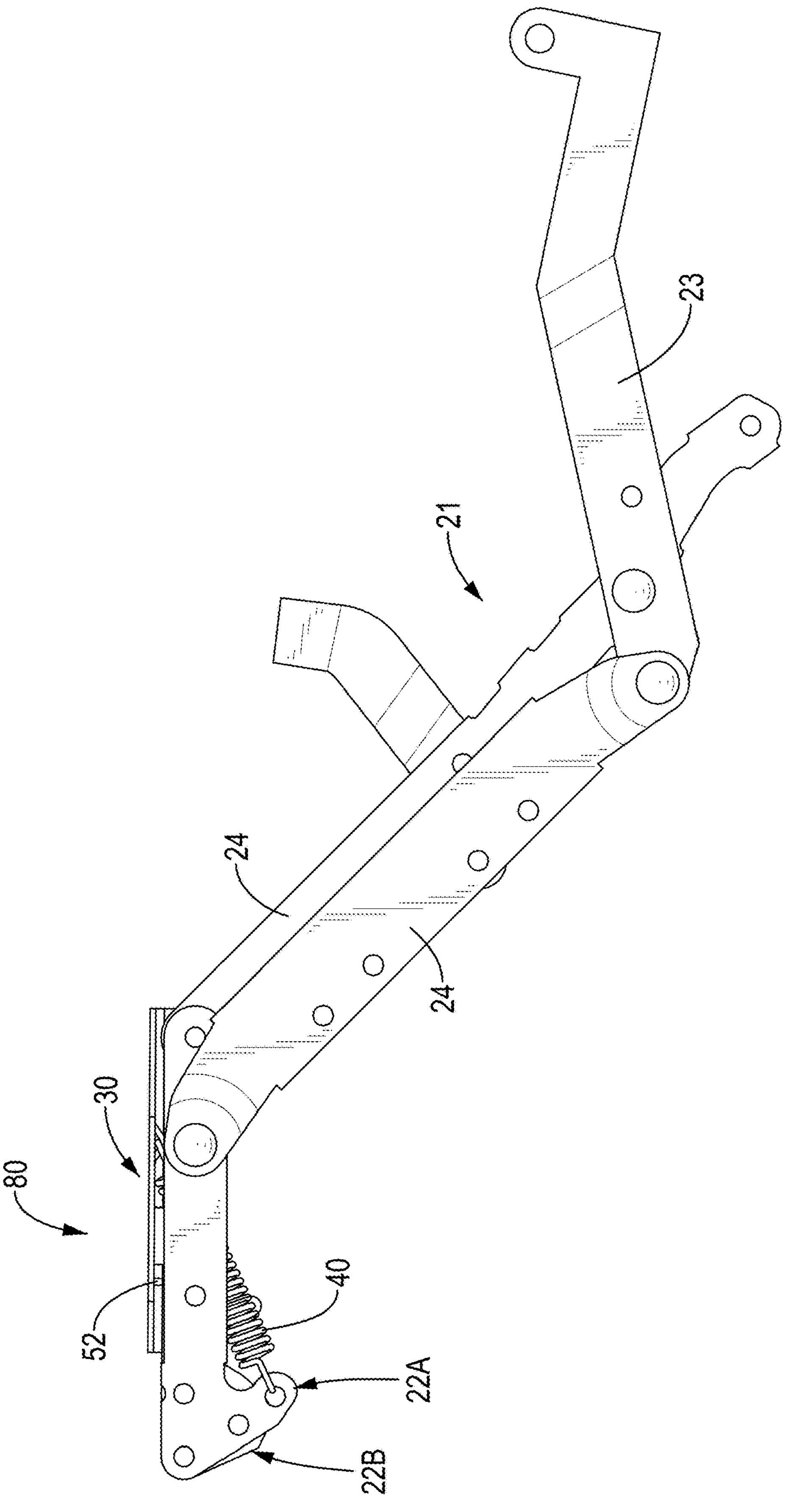
FIG. 4 is a side view of a linkage component of the linkage mechanism and a leg rest mount of the electric reclining chair in FIG. 1.
Figure 5:
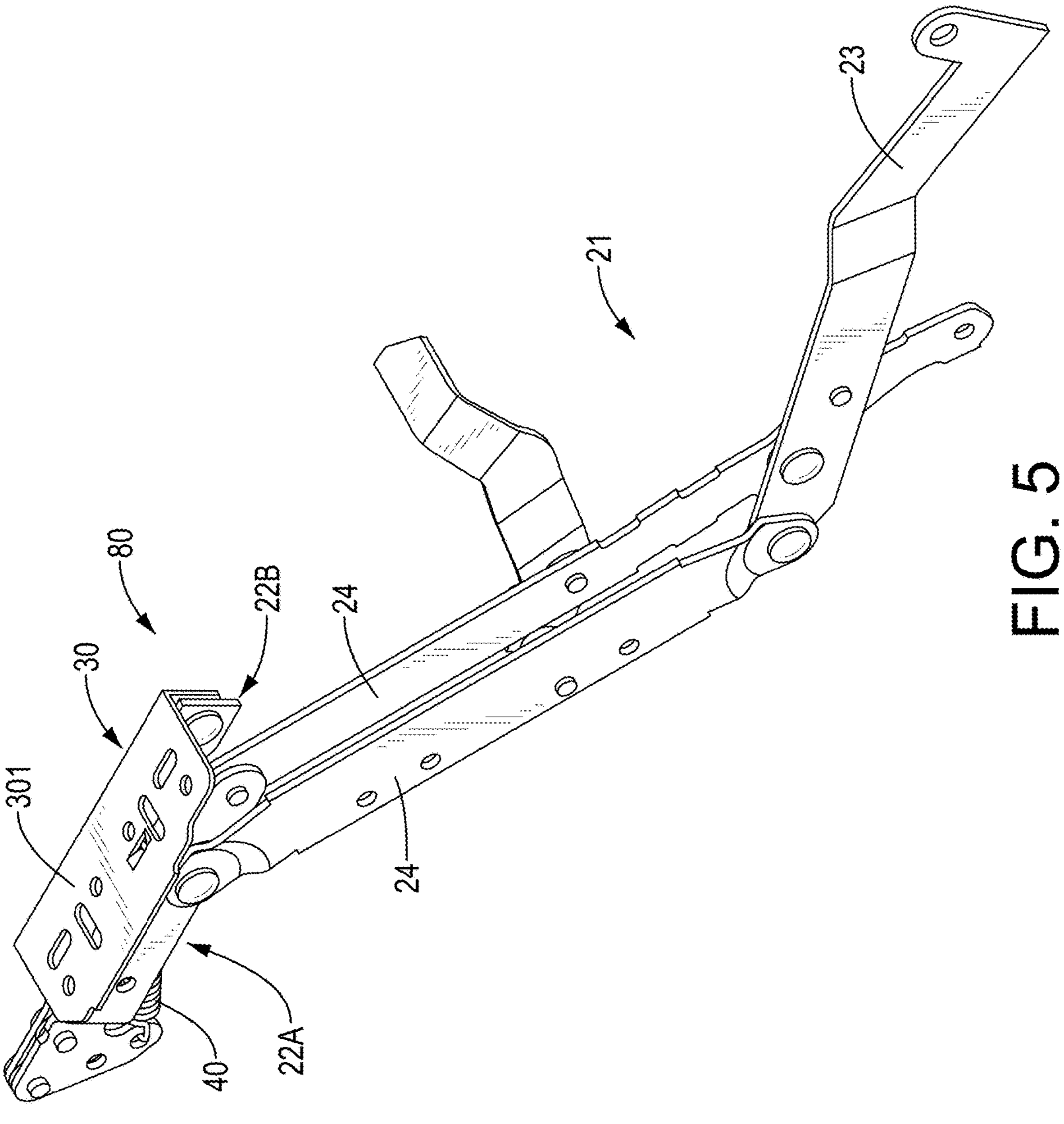
FIG. 5 is a perspective view of the linkage component and the leg rest mount of the electric reclining chair in FIG. 1.
Figure 6:
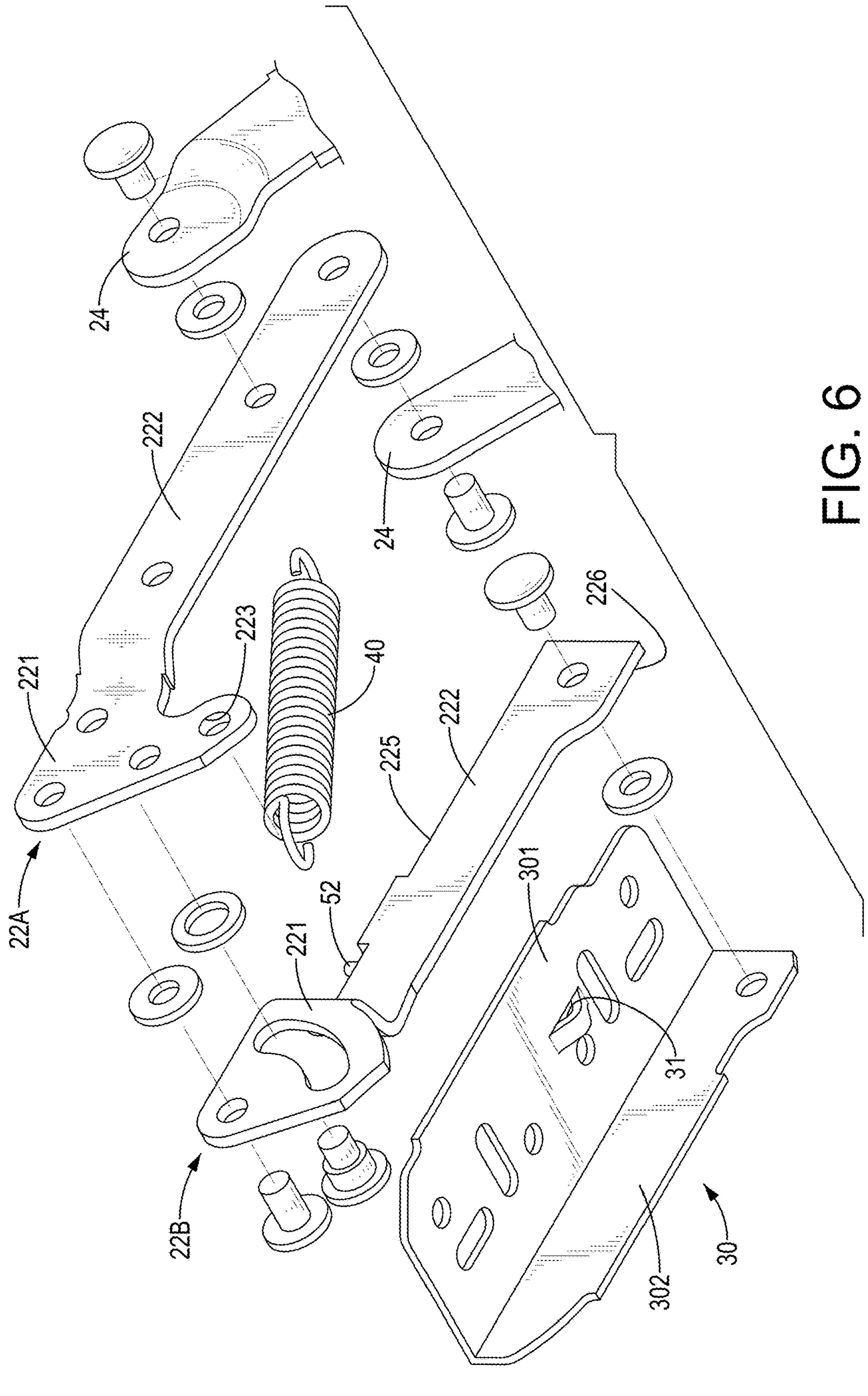
FIG. 6 is an exploded view of swing arms of the linkage component and the leg rest mount of the electric reclining chair in FIG. 1.
Figure 7:
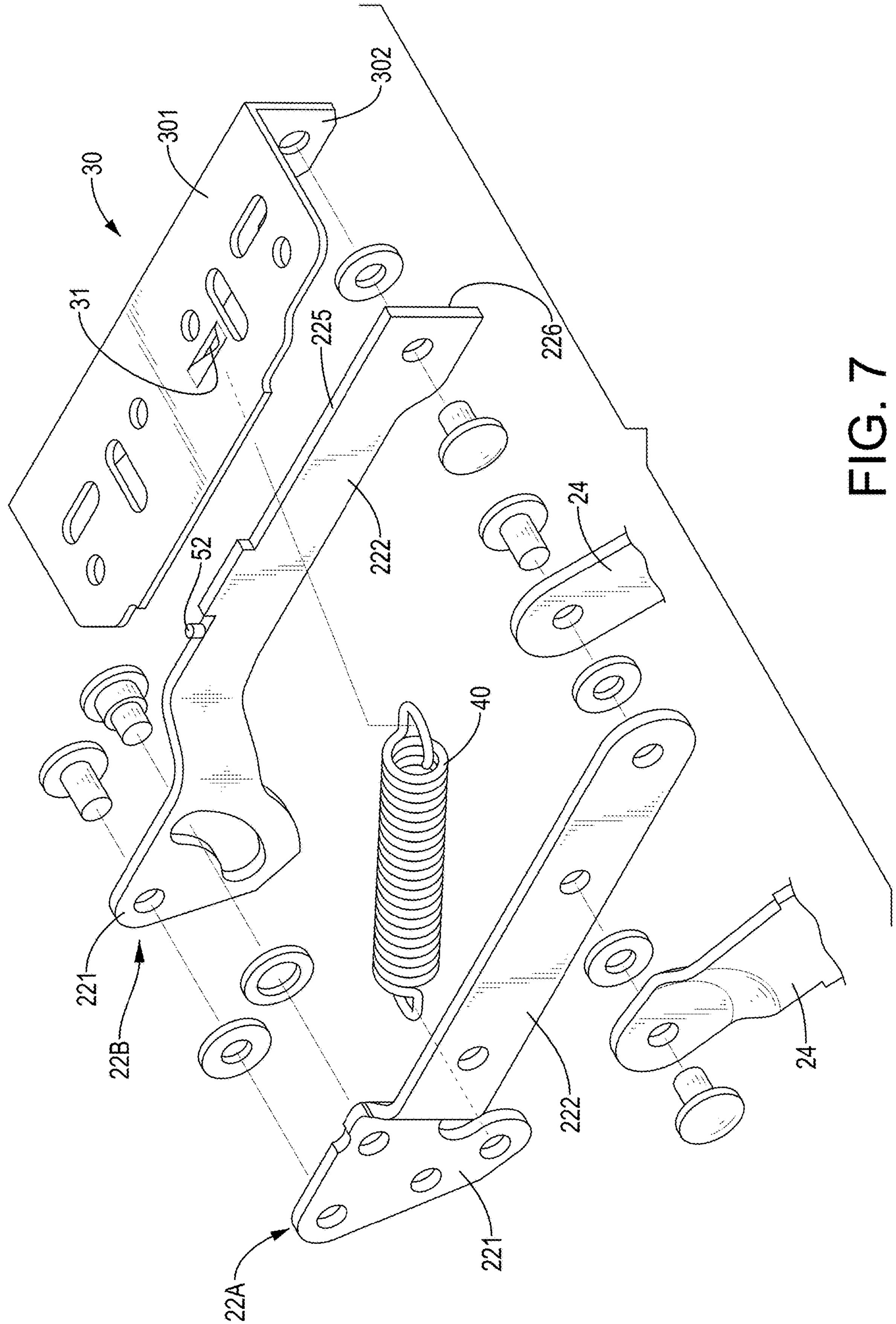
FIG. 7 is another exploded view of the swing arms of the linkage component and the leg rest mount of the electric reclining chair in FIG. 1.
Figure 8:
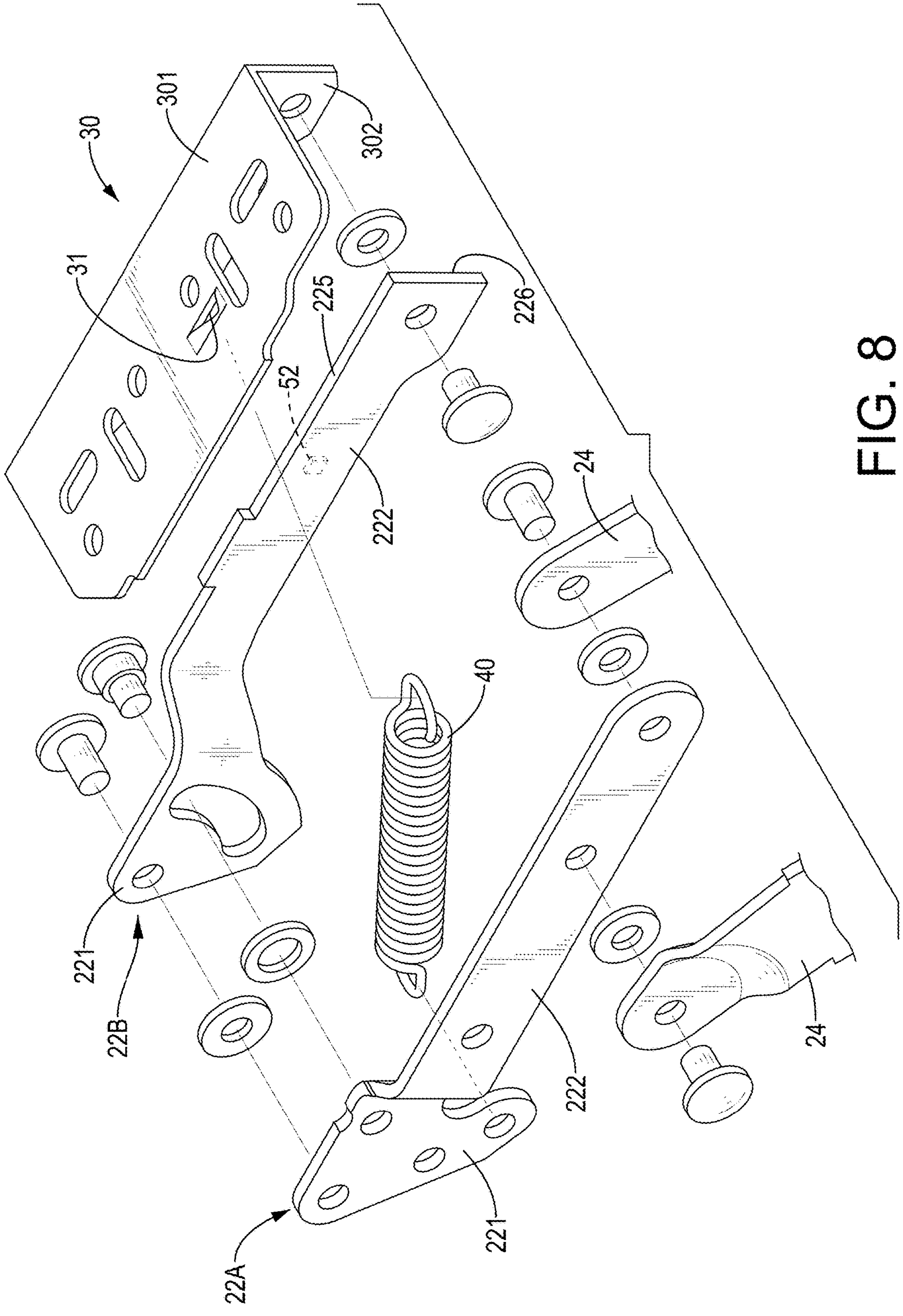
FIG. 8 is an exploded view of the swing arms and the leg rest mount of the electric reclining chair in FIG. 1 with a sensor module disposed at a different position.

With reference to FIGS. 4 and 5, each one of the two leg rest components 80 has a leg rest mount 30 and an elastic unit 40. With reference to FIGS. 5 to 7, the leg rest mount 30 is pivotally mounted to the corresponding linkage component 21. Specifically, the leg rest mount 30 is pivotally connected to the second swing arm 22B and has multiple holes for said leg rest pad to be fixed on the leg rest mount 30 via fasteners such as screws. The elastic unit 40 is connected to the leg rest mount 30 and the first swing arm 22A. With reference to FIGS. 6 and 7, specifically, the first swing arm 22A has a connecting hole 223, and the leg rest mount 30 has a hang hole 31. The elastic unit 40 is specifically a tension spring. An end of the elastic unit 40 is hooked to the connecting hole 223, and the other end of the elastic unit 40 is hooked to the hang hole 31.

With reference to FIGS. 2 and 3, normally, when said linkage component is folded or unfolded, the leg rest mount 30 pivotally connected to the second swing arm 22B moves along with but does not pivot relative to said linkage component 21 due to limitation of the elastic unit 40. Thereby, said leg rest pad 91 fixed on the leg rest mount 30 is folded or ascended as said linkage component 21 is folded or unfolded.

Figure 10:
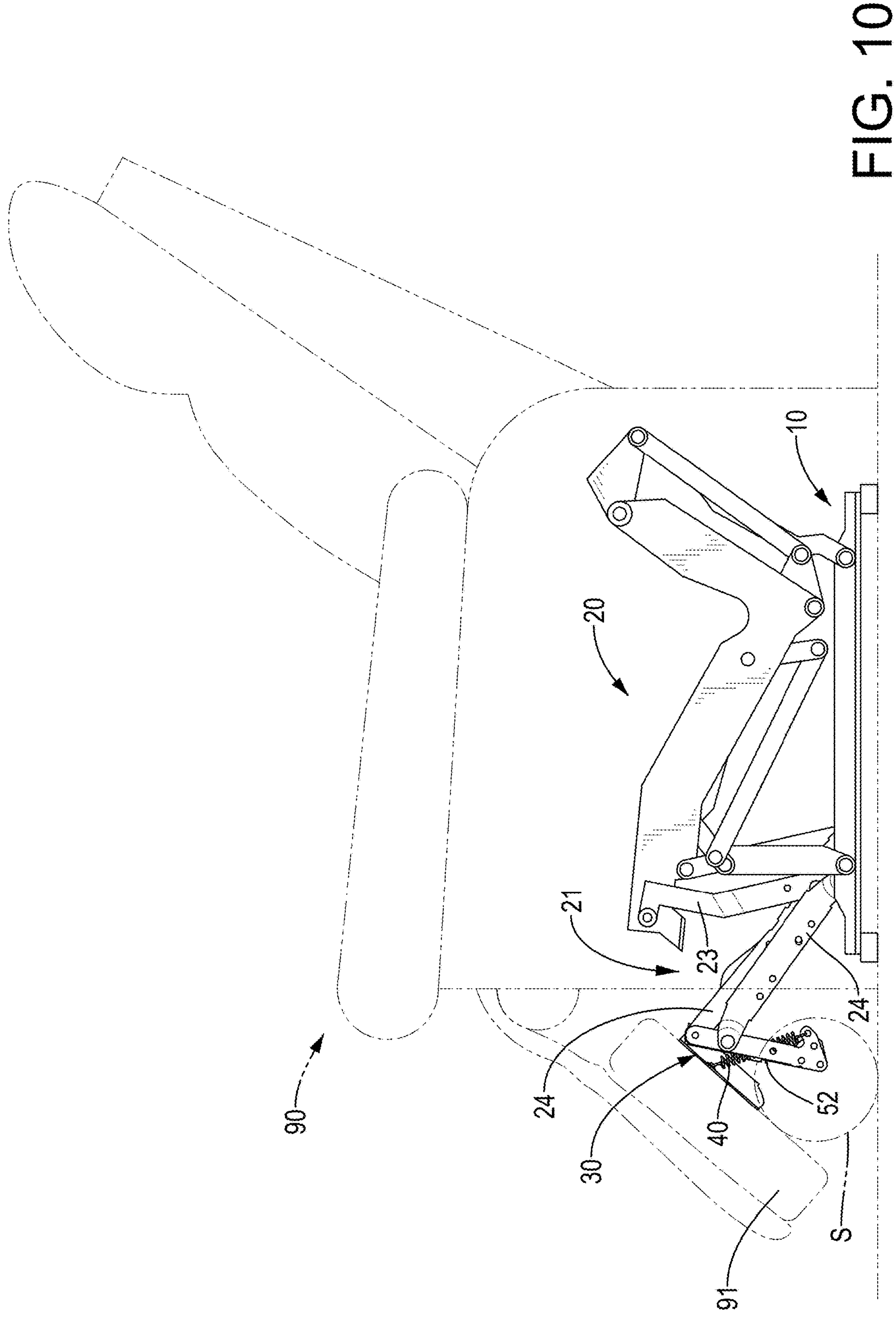
FIG. 10 is a side view of the linkage mechanism of the electric reclining chair in FIG. 1 pinching an object when being folded.

With reference to FIG. 10, in an exceptional circumstance, if an obstacle S (e.g. a basketball) is underneath and abuts said leg rest pad 91 when said leg rest pad 91 is being folded, the leg rest mount 30 and said leg rest pad 91 fixed on the leg rest mount 30 are stopped by the obstacle S while said linkage component 21 continues to be folded as the driver 60 drives the linkage mechanism 20. At the moment, the leg rest mount 30 pivots relative to and is pulled apart from the second swing arm 22B, and the elastic unit 40 is thus deformed elastically. Then, the control module 50 senses pivoting of the leg rest mount 30 relative to the second swing arm 22B so as to control the electric reclining chair.

With reference to FIG. 9, specifically, the control module 50 has a control unit 51 and two sensor modules 52. The control unit 51 is electrically connected to the two sensor modules 52 and the driver 60. The two sensor modules 52 respectively correspond to the two leg rest components 80, wherein said sensor module 52 may adopt a photoelectric sensor. The photoelectric sensor is disposed on the second swing arm 22B. After the leg rest mount 30 pivots relative to the second swing arm 22B, a light emitted from an emitter of the photoelectric sensor is no longer interrupted or reflected by the leg rest mount 30 and normally arrives at a receiver of the photoelectric sensor. The receiver detects change of the light to generate an electrical output to the control unit 51, and the control unit 51 controls the driver 60 according to the electrical output.

In other embodiments, said sensor module 52 may adopt a reed switch and a magnetic member respectively disposed on the leg rest mount 30 and the second swing arm 22B. After the leg rest mount 30 pivots relative to the second swing arm 22B, the magnetic member moves relative to the reed switch such that the reed switch connects or disconnects a circuit to the control unit 51 which is originally disconnected or connected. The control unit 51 controls the driver 60 according to a current change between connection and disconnection of the circuit.

In other embodiments, said sensor module 52 may adopt any one of a micro switch, a membrane switch, a tact switch, and a pressure sensor. After the leg rest mount 30 pivots relative to the second swing arm 22B, a construction first contacting said sensor module 52 is detached from said sensor module 52 such that said sensor module 52 generates an electrical output to the control unit 51 according to the above detachment. The control unit 51 then controls the driver 60 according to the electrical output.

In other embodiments, said sensor module 52 may adopt two or more sensors or switches from the above-mentioned sensors and switches to jointly sense pivoting of the leg rest mount 30 relative to the second swing arm 22B so as to increase sensing accuracy. Also, if said sensor module 52 adopts the micro switch, the membrane switch, or other sensor working via contact, said sensor module 52 may be disposed on a top surface of the second swing arm 22B with reference to FIG. 7 such that the leg rest mount 30 is configured to contact said sensor module 52. If said sensor module 52 adopts the photoelectric sensor, said sensor module 52 may be disposed on a side surface 226 of the second swing arm 22B to sense the change of the light while the second swing arm 22B pivots relative to the second swing arm 22B. The specific position of said sensor module 52 may be determined according to a working principle of adopted sensors or switches and is not particularly limited.

Details of the photoelectric sensor, the reed switch, and other sensors or switches are conventional. As long as said sensor module 52 is configured to sense pivoting of the leg rest mount 30 relative to the second swing arm 22B for the control unit 51 to control the driver 60; in other embodiments, said sensor module 52 may be disposed on the leg rest mount 30 and/or the first swing arms 22A, and said sensor module 52 may adopt another sensor or switch. Configuration of said sensor module 52 is not limited to the preferred embodiment.

After said sensor module 52 senses pivoting of the leg rest mount 30 relative to the second swing arm 22B and sends its electrical output to the control unit 51, the control unit 51 sends an electrical signal to the driver 60 for controlling the driver 60 to stop folding the linkage mechanism 20 or to reversely unfold the linkage mechanism 20. The above two means both prevent the linkage mechanism 20 from continuing to be folded and driving the leg rest mount 30 and said leg rest pad 91 to press the obstacle S underneath. Thereby, when said leg rest pad 91 is being folded with an obstacle thereunder, the electric reclining chair with anti-pinch protection in accordance with the present invention is configured to sense the obstacle in time and stop the linkage mechanism 20 from driving the leg rest mount 30 and said leg rest pad 91 to press the obstacle, which not only prevents the linkage mechanism 20 from structural damage but also prevents kids or pets from being pinched when they stretch hands or feet into the space under said leg rest pad 91.

Further, with reference to FIG. 9, the electric reclining chair has an alarm 71 electrically connected to the control unit 51 and controllable by the control unit 51 to make a sound. Specifically, the alarm 71 may be a buzzer or a speaker. When said sensor module 52 senses pivoting of the leg rest mount 30 relative to the second swing arm 22B, the control unit 51 controls the driver 60 to stop folding the linkage mechanism 20 or to reversely unfold the linkage mechanism 20. At the same time, the control unit 51 controls the alarm 71 to make a sound to alarm a user about existence of the obstacle S.

Figure 11:
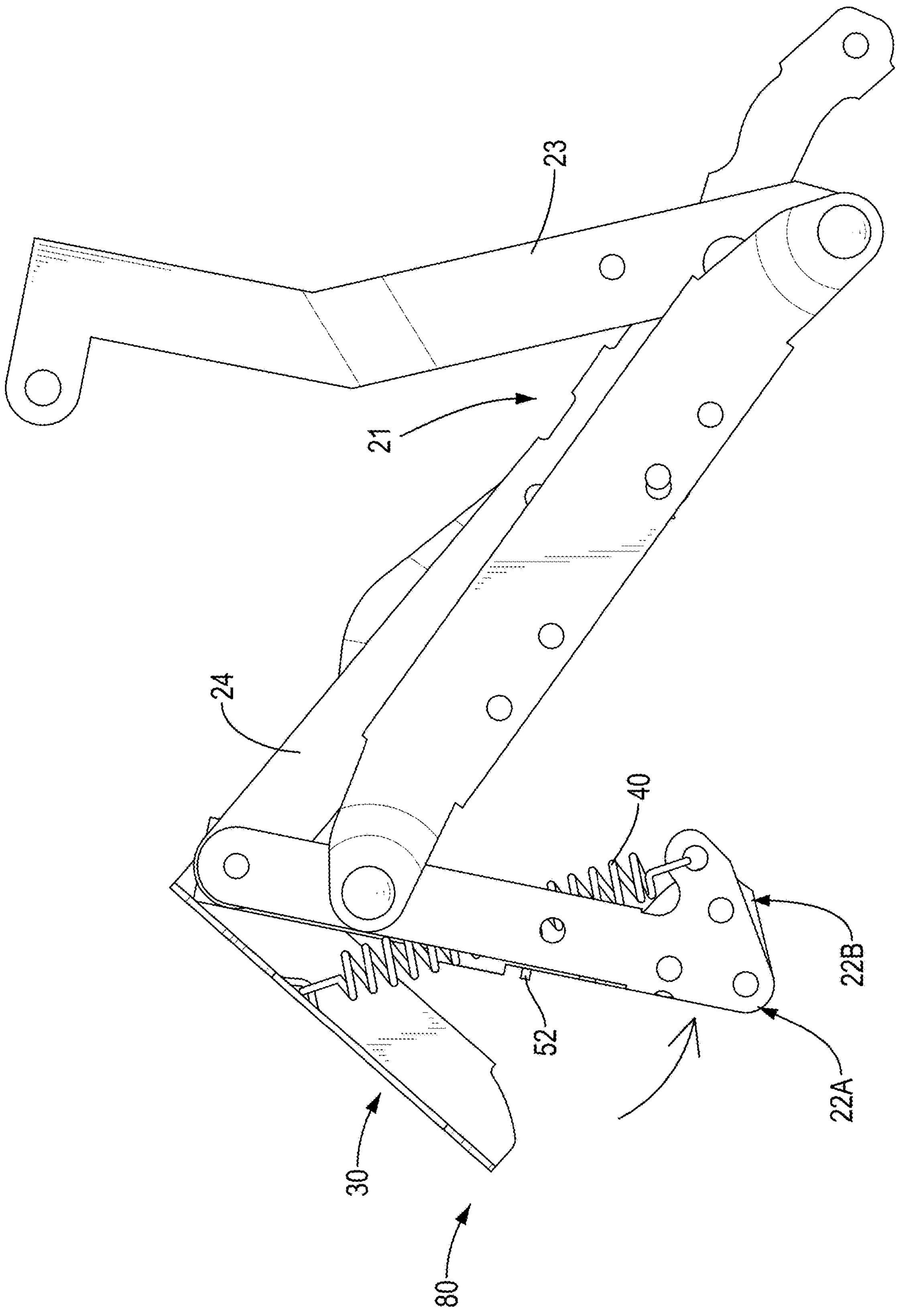
FIG. 11 is a side view of the leg rest mount pivoting relative to the swing arms of the electric reclining chair in FIG. 10.

With reference to FIGS. 6 and 7, in the preferred embodiment, each one of the two swing arms 22 has a pivot-connecting portion 221 and an extending portion 222. The pivot-connecting portions 221 of the two swing arms 22 are attached to and pivotally connected to each other. The leg rest mount 30 is pivotally connected to the extending portion 222 of the second swing arm 22B. Thereby, when an external force is applied on said leg rest pad 90, the leg rest mount 30 pivots relative to the second swing arm 22B with reference to FIG. 11 as described above. Said sensor module 52 is disposed on the extending portion 222 of the second swing arm 22B.

With reference to FIGS. 5 to 7, the extending portion 222 is bended and extends from the pivot-connecting portion 221, and the extending portions 222 of the two swing arms 22 are spaced from each other; i.e. the two swing arms 22 form a fork-shaped construction. The leg rest mount 30 has a mount board 301 and a side board 302. The side board 302 is pivotally connected to the extending portion 222 of the second swing arm 22B, and the mount board 301 perpendicularly extends from an edge of the side board 302 and extends over the extending portions 222 of the two swing arms 22. The elastic unit 40 is located between the extending portions 222 of the two swing arms 22, and said connecting hole 223 and said hang hole 31 for hooking the elastic unit 40 are respectively formed on the pivot-connecting portion 221 of the first swing arm 22A and the mount board 301. With the fork-shaped construction formed by the two swing arms 22 and the mount board 301 across the two swing arms 22, the elastic unit 40 is less likely to tilt and to interfere with other components during elastic deformation, which prolongs a service life of the elastic unit 40.

With reference to FIGS. 2, 3, and 9, in the preferred embodiment, the electric reclining chair further has two sensor components 11. The two sensor components 11 are electrically connected to the control unit 51 and disposed on an inner side of the base 10 at a spaced interval to sense whether any object enters an interior of the base 10 or not. Specifically, said sensor components 11 may adopt a photoelectric sensor. If a pet, a kid, or other object enters the interior of the base 10 when the electric reclining chair remains static with the linkage mechanism 20 unfolded, the photoelectric sensor senses a change of light in the interior of the base 10, generates and sends an electrical signal to the control unit 51 so as to control the driver 60 to stop operating. Even if related buttons or switches are pressed, the electric reclining chair remains static to prevent the object in the interior of the base 10 from being pressed. Also, the control unit 51 may control the alarm 71 to make a noise so as to notify a user that an object has entered the interior of the base 10.

More specifically, the base 10 has two base rods arranged symmetrically, and said sensor component 11 may adopt laser and time-of-flight (ToF) to sense an object. When no object is between the two base rods, a laser beam is emitted from one of the two base rods, is reflected by the other one of the two base rods, returns to and is received at the original spot. Thereby, said sensor component 11 measures the distance between the two base rods by the time from emitting the laser beam to receiving the laser beam. Afterwards, if any object enters between the two base rods of the base 10 to interfere with the laser, the distance measured by said sensor component 11 changes, and the control unit 51 controls the driver 60 to stop operating according to the change of the distance measured by said sensor component 11.

In other embodiments, said sensor component 11 may adopt a photo interrupter. When an object enters between the two base rods, the object interrupts a light emitted by said sensor component 11 from one of the two base rods to the other one of the two base rods to be received by said sensor component 11, which allows said sensor component 11 to sense the object. In other embodiments, as long as the electric reclining chair has at least one said sensor component 11 configured to sense the object entering the interior of the base 10, configuration and number of said sensor components 11 can be determined according to requirement, which is not limited to the preferred embodiment.

Also, in other embodiments, the electric reclining chair may have a covering board connected to the seat body 90 and disposed between the two linkage components 21 of the linkage mechanism 20 to prevent objects from entering the interior of the base 10.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electric reclining chair with anti-pinch protection comprising:
- a base;
- a linkage mechanism movably mounted on the base and connected to a driver;
- at least one leg rest mount pivotally connected to the linkage mechanism; and
- a control module having
  - at least one sensor module; and
  - a control unit electrically connected to the at least one sensor module and the driver for controlling the driver to unfold or fold the linkage mechanism;
- wherein if the at least one leg rest mount pivots relative to the linkage mechanism when the linkage mechanism is being folded, the at least one sensor module senses pivoting of said leg rest mount relative to the linkage mechanism to send a signal to the control unit such that the control unit controls the driver to stop folding the linkage mechanism or to unfold the linkage mechanism.

2. The electric reclining chair with anti-pinch protection as claimed in claim 1, wherein the electric reclining chair has at least one elastic unit connected to said leg rest mount and the linkage mechanism.

3. The electric reclining chair with anti-pinch protection as claimed in claim 2, wherein
- the linkage mechanism has two swing arms respectively being a first swing arm and a second swing arm;
- the first swing arm is connected between the driver and the second swing arm and is connected to the elastic unit; and
- said leg rest mount is pivotally connected to the second swing arm to be pivotable relative to the first swing arm and the second swing arm.

4. The electric reclining chair with anti-pinch protection as claimed in claim 3, wherein each one of the two swing arms has a pivot-connecting portion and an extending portion;

the pivot-connecting portions of the two swing arms are pivotally connected to each other;

the extending portions of the two swing arms are spaced from each other;

said leg rest mount has a mount board extending over the extending portions of the two swing arms; and the elastic unit is located between the extending portions of the two swing arms and has two opposite ends respectively connected to the pivot-connecting portion of the first swing arm and the mount board.

5. The electric reclining chair with anti-pinch protection as claimed in claim 2, wherein the elastic unit is a tension spring.

6. The electric reclining chair with anti-pinch protection as claimed in claim 3, wherein the elastic unit is a tension spring.

7. The electric reclining chair with anti-pinch protection as claimed in claim 4, wherein the elastic unit is a tension spring.

8. The electric reclining chair with anti-pinch protection as claimed in claim 1, wherein the electric reclining chair has at least one sensor component electrically connected to the control unit and disposed on an inner side of the base to sense whether any object enters an interior of the base.

9. The electric reclining chair with anti-pinch protection as claimed in claim 4, wherein the electric reclining chair has at least one sensor component electrically connected to the control unit and disposed on an inner side of the base to sense whether any object enters an interior of the base.

10. The electric reclining chair with anti-pinch protection as claimed in claim 8, wherein said sensor component is a photoelectric sensor or a photo interrupter.

11. The electric reclining chair with anti-pinch protection as claimed in claim 9, wherein said sensor component is a photoelectric sensor or a photo interrupter.

12. The electric reclining chair with anti-pinch protection as claimed in claim 8, wherein the electric reclining chair has an alarm electrically connected to the control unit and controllable by the control unit to make a sound.

13. The electric reclining chair with anti-pinch protection as claimed in claim 9, wherein the electric reclining chair has an alarm electrically connected to the control unit and controllable by the control unit to make a sound.

14. The electric reclining chair with anti-pinch protection as claimed in claim 1, wherein the electric reclining chair has an alarm electrically connected to the control unit and controllable by the control unit to make a sound.

15. The electric reclining chair with anti-pinch protection as claimed in claim 4, wherein the electric reclining chair has an alarm electrically connected to the control unit and controllable by the control unit to make a sound.

16. The electric reclining chair with anti-pinch protection as claimed in claim 1, wherein said sensor module includes at least one of a photoelectric sensor, a reed switch, a micro switch, a membrane switch, a tact switch, and a pressure sensor.

17. The electric reclining chair with anti-pinch protection as claimed in claim 4, wherein said sensor module includes at least one of a photoelectric sensor, a reed switch, a micro switch, a membrane switch, a tact switch, and a pressure sensor.

* * * * *